July 17, 1928.  G. B. SAYRE  1,677,215
MOUNTING FOR WINDSHIELD WIPERS
Filed Jan. 23, 1926   2 Sheets-Sheet 1
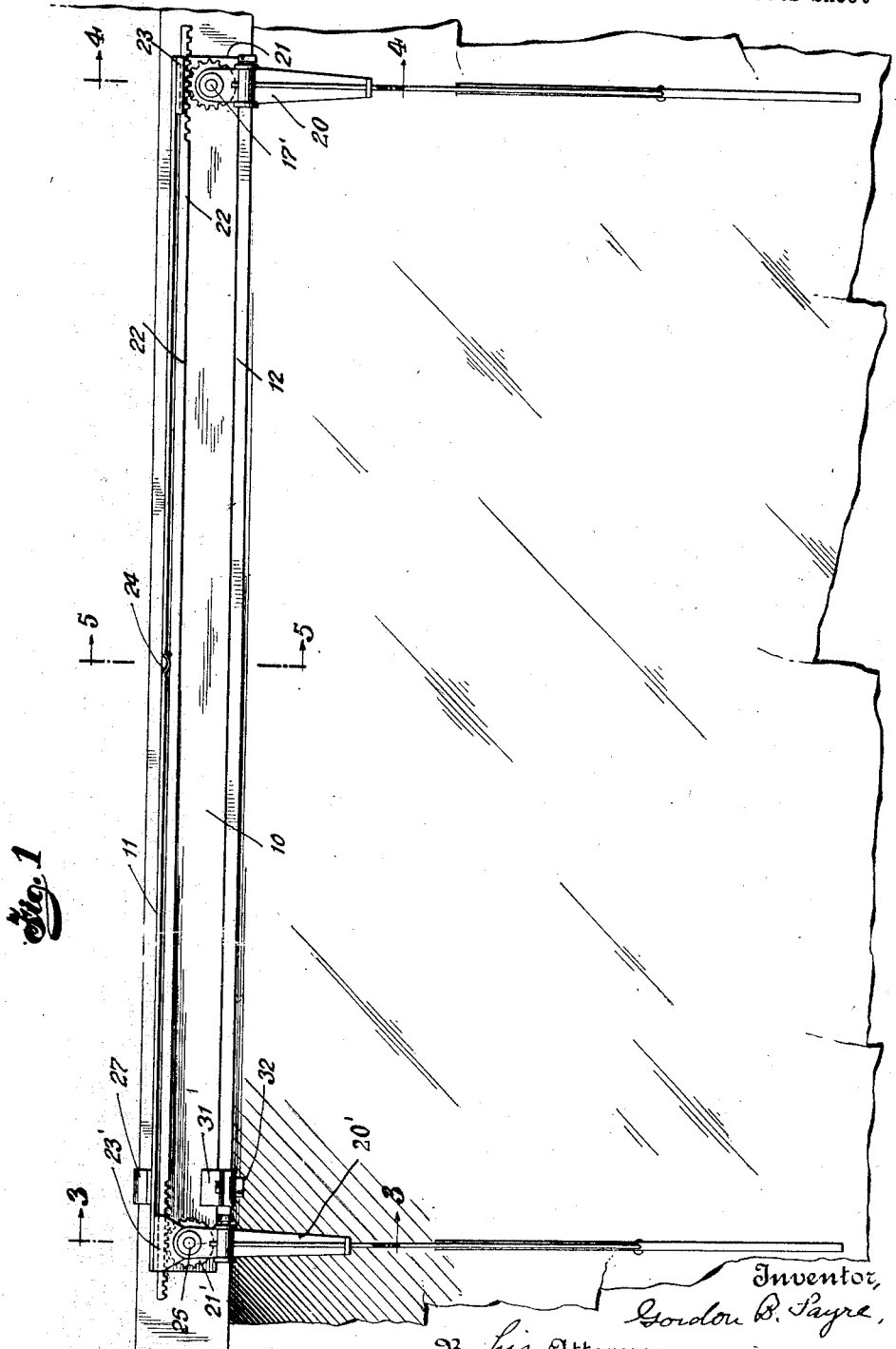

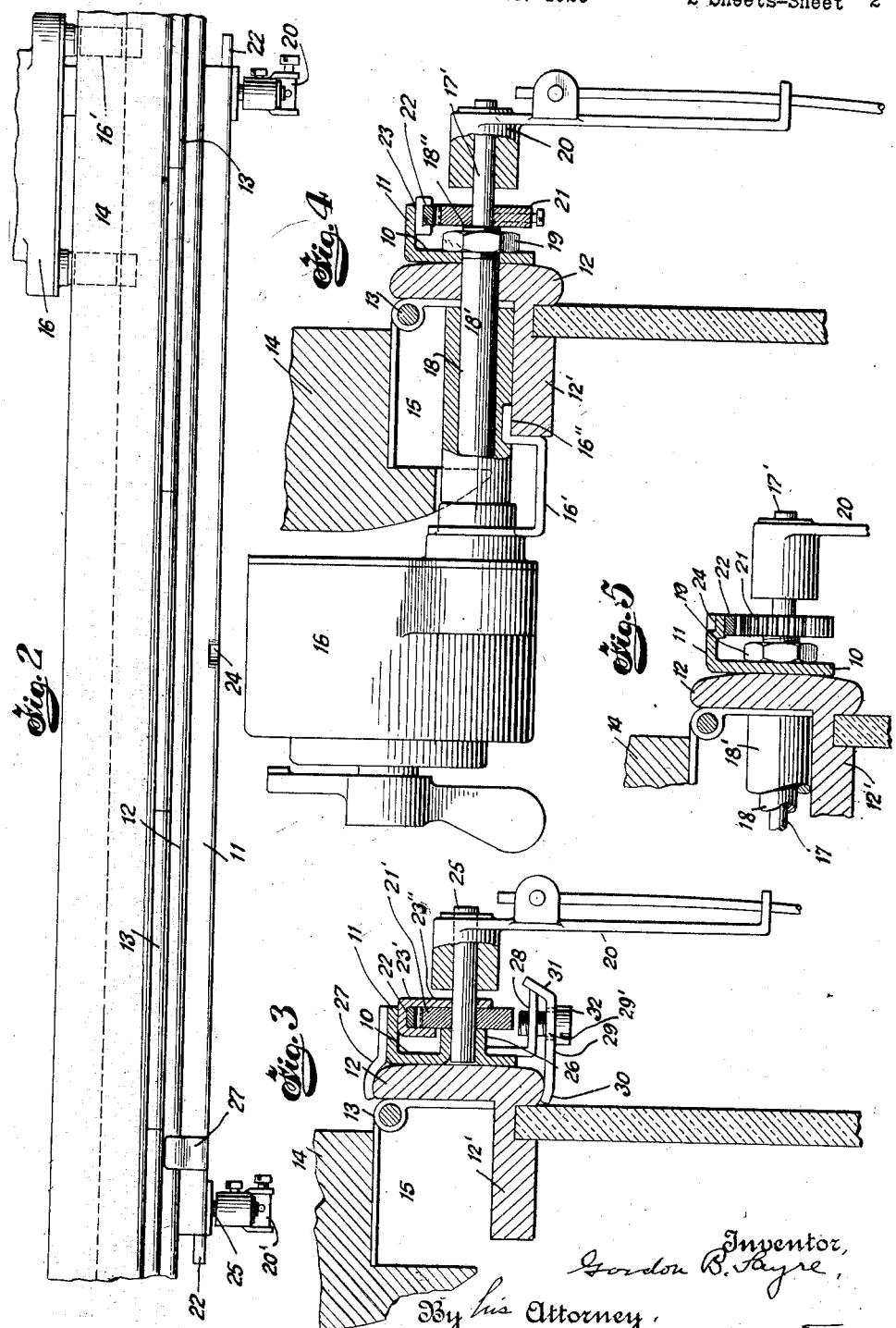

Patented July 17, 1928.

1,677,215

UNITED STATES PATENT OFFICE.

GORDON B. SAYRE, OF SYRACUSE, NEW YORK, ASSIGNOR TO OWEN-DYNETO CORPORATION, OF SYRACUSE, NEW YORK, A CORPORATION OF NEW YORK.

MOUNTING FOR WINDSHIELD WIPERS.

Application filed January 23, 1926. Serial No. 83,263.

My invention relates to improvements in a means for mounting a wind shield wiper on the frame of a wind shield of an automobile.

The invention is particularly applicable to a mounting for tandem wind shield wipers.

The object of the invention is to produce a simple and inexpensive mounting which can be easily applied by an inexperienced person in a manner to efficiently support the wind shield wipers, their operating mechanism and the motor in operating position.

My invention is also intended to produce a structure of the kind described which is so easily applied that it is only necessary to drill one small hole through the sash of the wind shield in order to properly attach the mounting.

The invention is also intended to be light, exceedingly strong and adapted for application in such a way as to be inconspicuous.

The invention is further intended to produce a structure in which the main support is of angular form so that it may be light and yet strong and in which one flange of the main body acts as a hood to protect the operating parts from dirt and injury.

The invention is further intended to provide a structure of the kind described which is unusually neat in appearance and this is an important feature in a structure which is to be applied to a prominent part of the car like the wind shield.

These and other advantages will appear from the description which follows.

Reference is to be had to the accompanying drawings in which similar reference characters represent corresponding parts in all the views.

Figure 1 is a broken front elevation showing my improved mounting adapted for operating a tandem wind shield wiper and applied to a wind shield.

Figure 2 is a broken plan view of the structure shown in Figure 1.

Figure 3 is a cross section on the line 3—3 of Figure 1.

Figure 4 is a cross section on the line 4—4 of Figure 1, and

Figure 5 is a cross section on the line 5—5 of Figure 1.

The body of the mounting or support comprises a thin strip 10 having a forwardly projecting flange 11 thus making a light angle bar which by reason of the angle is exceptionally strong and the flange 11 besides acting as a brace serves as a hood to protect the operating parts as described below.

It will be noted that the body is narrower than the upper sash 12 to which it is applied and for this reason it is not noticeable from the interior of the car and is neat and inconspicuous from the exterior.

In the structure of wind shield shown the sash 12 is hinged as shown at 13 to the adjacent frame 14 of the car front and the latter is recessed on the under side shown at 15 to provide for the swinging of inwardly projecting ledge 12' of the sash 12.

The windshield wipers or wiping elements are operated by a motor 16 of suitable character for oscillating the wipers but which forms no part of this invention. It can be supported, however, in operative position by the mounting which forms part of the invention. As shown the motor has a pair of brackets 16' spaced apart thereon, these being of general U shape as shown in Figure 4 so that one side of the brackets will fit against the inner edge of the ledge 12' and the brackets terminate in flanges 16'' which lie on the top surface of the ledge 12'. Thus the brackets without any fastening except the securement of the motor shaft as presently described serve to hold the motor in operating position.

The motor driving shaft 17 extends through a sleeve 18' attached to the motor and passing through a tube 18 which is a part of the windshield structure, being attached to the ledge 12'. The outer end of the sleeve 18' projects through the sash 12 and a corresponding hole in the body 10.

The outer end of the sleeve is screw threaded as shown at 18'' and receives a nut 19. Thus it will be seen that if the body 10 is placed flatwise against the sash 12 and parallel therewith and the motor shaft and sleeve are placed in position, then by tightening up the nut 19 the body 10 is clamped securely in place and the motor 16 is also securely held by reason of the brackets 16' which are locked in position by the same act of turning up the nut 19. This single act of positioning the parts and then tightening the nut serves to fasten the whole apparatus in place, but if desired another screw or bolt can be passed through the parts 10 and 12 thus making an absolutely rigid and permanent support.

The shaft 17' of the motor projects forward a sufficient distance to carry the wiping element 20 which can be of any preferred kind and which operates in the customary way by oscillating against the wind shield glass.

Secured to the shaft 17' in close abutment with the sleeve 18 is a gear 21 which is oscillated by the movement of the motor and its shaft and which engages and reciprocates a toothed rack 22 which extends lengthwise of the body 10 and beneath the projecting hood or flange 11.

At the motor end of the device the rack 12 is guided in a channel member 23 which is fastened to the under side of the hood or flange 11 and can be conveniently and rigidly secured by spot welding.

The rack 22 extends beneath and parallel with the hood or flange 11 which to prevent vibration of the rack may be bent downwards slightly as at 24 so as to form a bearing against which the rack lightly rides.

At an appropriate distance from the wiping element 20 is a second wiping element 21 and the means for operating these from the rack 22 is provided for as follows.

At this point a second channel 23' is provided which guides the rack 22 which is deeper so as to afford a means of guiding the second operating gear 21', one side of the channel member 23' being also made long enough to form a support 23'' for the shaft of the wiping element 21'.

A further bearing is also provided for this shaft 25 by simply punching in the metal of the body 10 at this point as illustrated at 26 in Figure 3. Thus a firm bearing is made for the shaft 25 and at the same time a guide for the operating gear 21' and the rack 22.

Near the end portion of the support which is farthest from the motor the body 10 is provided with a clamping member 27 which is on the top of the flange or hood 11 and which is shaped to fit the top edge of the sash 12.

On the lower part of the body 10 and preferably in vertical alignment with the member 27 is an L shaped bracket 28. A second clamping member 29 aligning with the parts 27 and 28 is shaped to fit the lower edge of the sash 12 and has its outer end preferably turned up as shown at 31. This member 29 receives a screw bolt 32 or the like which is threaded in the part 28 and thus if the clamping members 27 and 29 are placed respectively on the upper and lower edges of the sash 12 and the bolt 32 turned home, the parts will be securely clamped. The hole 29' through the part 29 is large enough to permit the said part 29 to be adjusted in and out so that it may be nicely seated on the lower edge of the sash 12. The second end of the mounting is rigidly fastened to the sash and the whole apparatus is secured with the necessity of making but one hole through the sash 12 that is to receive the part 18 as already described, though if it is desired to put a hole through the body 10 and sash 12 near the second end of the body, this can be done to make it even more rigid.

From the foregoing description it will be seen that the mounting for the tandem wiping elements, their operating mechanism and even the motor is of a very simple, neat, strong and substantial character, so that the whole can be assembled for shipment and then easily applied by any person of ordinary intelligence to the sash of the wind shield.

The structure shown and described is peculiarly adapted for driving a tandem wind shield wiper but it will be seen that if desired the second wiping element can be dispensed with and that the means disclosed especially as illustrated in Figure 4 for fastening and driving the shaft and motor to the sash in applicable for use in driving a single wiping element and affords a convenient, simple and substantial means of mounting such a mechanism.

I claim—

1. A mounting for wind shield wipers comprising an elongated body portion shaped to fit against the outer face of a wind shield sash, such body being perforated near one end to receive a driving shaft, clamping means on said body near the other end and engaging the upper and lower edge portions of the sash to support said body, and means supported on said body for driving a plurality of wiping elements.

2. A mounting for wind shield wipers comprising an elongated body of angular cross section adapted to fit against the face of a wind shield sash with an angular portion uppermost to form a hood, said body being pierced near one end portion to receive a driving shaft, a driving shaft extending through the body and adapted to carry a wiping element, a second shaft supported on the body parallel with the driving shaft and adapted to carry a wiping element, and a driving connection between the two shafts, said driving connection being located beneath the aforesaid hood.

3. A mounting for wind shield wipers comprising an elongated body adapted to fit against the sash of a wind shield and having a forwardly projecting hood, said body being pierced to receive a driving shaft, a driving shaft extending through said body and clamped to the body and sash, a second shaft mounted on the body parallel with the first shaft, each of said shafts being adapted to carry wiping elements, gears on the two shafts, a toothed rack connecting said gears and channel members on the hood to guide the rack.

4. A mounting for wind shield wipers comprising an elongated body shaped to fit against a wind shield sash and having a forwardly projecting hood at its upper edge, said body being pierced to receive a driving shaft, a driving shaft extending through the body and adapted to carry a wiping element, means for clamping the shaft and body to the aforesaid sash, a second shaft spaced apart from the first and adapted to carry a second wiping element, gears on the two shafts, a toothed rack connecting the gears, and channel members on the under side of the hood serving to guide the rack, one of said members being prolonged to afford a bearing for the second shaft.

5. A mounting for wind shield wipers comprising an elongated body shaped to fit the sash of a wind shield and having a forwardly projecting flange forming a hood, said body being pierced to receive a driving shaft, means for clamping the driving shaft and body to the sash, a second shaft mounted on the body parallel with the driving shaft, each of said shafts being adapted to carry a wiping element, gears on the two shafts, a toothed rack connecting the gears, channel members on the under side of the hood to guide the rack and means spaced from the driving shaft for clamping the body to the sash.

6. A mounting for wind shield wipers comprising an elongated body shaped to fit the sash of a wind shield and provided with an opening extending therethrough, a driving shaft extending through said opening and the sash and adapted to carry a wiping element, means for clamping the driving shaft to the sash and body, a second shaft spaced apart from the driving shaft and parallel therewith, such second shaft being also adapted to carry a wiping element, gears on the two shafts, a toothed rack connecting the gears, channel members on the body serving to guide the toothed rack and one of the gears, and clamping means adjacent the second shaft and arranged to secure the body to the sash.

6. A mounting for wind shield wipers comprising a thin flat body having a forwardly projecting flange forming a hood, said body being shaped to fit the sash of a wind shield, a driving shaft extending through the sash and body near one end portion of the latter, means for clamping the shaft and body to the sash, shaft bearings supported on the body and spaced apart from the driving shaft, a second shaft mounted in said bearings, a rack and gear connection between the two shafts, and a clamping device near the second shaft for securing said body to the sash, said clamping device fitting the upper and lower portions of the said sash.

8. In a structure of the kind described the combination with a hooded body having near one end thereof a driving shaft and means for clamping the body and shaft to the sash of a wind shield, of a second shaft bearing spaced apart from the driving shaft and formed in part by punching in the metal of the body, a second shaft mounted in said bearing, a rack and gear connection between the two shafts, and a clamp on the upper and lower parts of the body arranged to engage the upper and lower edges of the wind shield sash.

9. In a mounting for wind shield wipers the combination with a hooded body shaped to fit the sash of a wind shield and having a driving shaft at one end thereof, of a shaft bearing on the said body a second shaft in said shaft bearing, a gear and rack connection between the two shafts, channel members secured to the hood of the body and guiding the rack, one of said members forming in part the bearing of the second shaft, a clamping member on the upper part of the body engaging the upper edge of a sash and the clamping member on the lower part of the body engaging the lower edge of the sash.

10. A mounting for a wind shield wiper comprising a body portion adapted to fit against the sash of a windshield and provided with a flange forming a hood, spaced shafts extending through said sash and body portion and adapted to carry wiper elements, means for driving one of said shafts, a rack and gear connection between said two shafts, means carried by said hood for guiding the rack of said connection, and clamping means engaging the upper and lower portions of said sash for securing the device to said sash.

11. A mounting for wind shield wipers comprising a motor having a driving shaft extending through a wind shield sash and adapted to carry a wiper element, a removable bracket engaging said motor and abutting with and resting on the top edge of the inner side of said wind shield sash, and means on the outer side of said sash for forcing said motor toward and holding said motor adjacent the sash whereby to securely position said bracket to support said motor.

12. In a structure of the kind described the combination of a motor, a bracket removably carried upon the motor and adapted to engage the inner part of a windshield sash, a sleeve extending from the motor, through the bracket and against the sash, a driving shaft extending from the motor through the sleeve and sash and adapted to carry a wiping element, and means for securing the outer end of the sleeve against the sash whereby to secure the supporting bracket and the motor to said sash.

13. A mounting for windshield wipers comprising a body portion positioned adjacent a windshield sash and provided with a flange forming a protecting hood, spaced shafts extending through said body portion and sash and adapted to carry wiper elements, a motor connected to one of said shafts, means engaging the inner side of the windshield sash for supporting said motor, means for forcing said motor toward and holding the same adjacent the windshield sash whereby to secure the engaging means in supporting position, rack and gear means connecting said two shafts, and guide means on said hood for guiding said rack in its movement.

In testimony whereof, I have signed my name to this specification this 15th day of January, 1926.

GORDON B. SAYRE.